United States Patent
Greenshpan et al.

(10) Patent No.: US 12,132,667 B2
(45) Date of Patent: Oct. 29, 2024

(54) ADAPTING SOFTWARE CODE TO DEVICE RESOURCE AVAILABILITY

(71) Applicant: NAMOGOO TECHNOLOGIES LTD., Herzeliya (IL)

(72) Inventors: Ohad Moti Greenshpan, Herzeliya (IL); Chemi Menachem Katz, Herzeliya (IL); Orr Siloni, Herzeliya (IL)

(73) Assignee: Namogoo Technologies Ltd., Herzliya (IL)

( * ) Notice: Subject to any disclaimer, the term of this patent is extended or adjusted under 35 U.S.C. 154(b) by 406 days.

(21) Appl. No.: 17/610,586

(22) PCT Filed: Jun. 24, 2020

(86) PCT No.: PCT/IB2020/000522
§ 371 (c)(1),
(2) Date: Nov. 11, 2021

(87) PCT Pub. No.: WO2020/260945
PCT Pub. Date: Dec. 30, 2020

(65) Prior Publication Data
US 2022/0239603 A1 Jul. 28, 2022

Related U.S. Application Data

(60) Provisional application No. 62/865,717, filed on Jun. 24, 2019.

(51) Int. Cl.
*H04L 47/762* (2022.01)
*H04L 47/70* (2022.01)
(Continued)

(52) U.S. Cl.
CPC .......... *H04L 47/762* (2013.01); *H04L 47/788* (2013.01); *H04L 47/828* (2013.01); *H04L 67/02* (2013.01)

(58) Field of Classification Search
CPC ... H04L 47/762; H04L 47/788; H04L 47/828; H04L 67/02; G06F 8/41; G06F 8/77
See application file for complete search history.

(56) References Cited

U.S. PATENT DOCUMENTS 11,102,282 B2 * 8/2021 Chatt .................... H04L 47/783
2013/0232472 A1 * 9/2013 Korner ...................... G06F 8/77
717/127

(Continued)

*Primary Examiner* — Deepa Belur
(74) *Attorney, Agent, or Firm* — Lowenstein Sandler LLP

(57) ABSTRACT

Systems and methods are disclosed for generating adaptive code based on resource availability. The systems and methods measure, by a code set executed via a web browser of a first user device, a first set of data associated with the first user device of multiple user devices. The code set further measures a second set of data associated with a computing environment of the first user device. A first value for a resource availability function is calculated in view of the first set of data and the second set of data. The first value is compared to a set of values for the resource availability function associated with the plurality of user devices to determine a classification for the first user device. A level of activity of the code set is adjusted in view of a rule associated with the classification of the first user device.

20 Claims, 4 Drawing Sheets

(51) Int. Cl.
*H04L 47/78* (2022.01)
*H04L 67/02* (2022.01)

(56) References Cited

U.S. PATENT DOCUMENTS

| | | |
|---|---|---|
| 2016/0302148 A1 | 10/2016 | Buck et al. |
| 2018/0275988 A1* | 9/2018 | Shmaya .................... G06F 8/71 |
| 2018/0316621 A1 | 11/2018 | Ferris et al. |
| 2019/0132736 A1 | 5/2019 | Raleigh et al. |
| 2021/0194825 A1* | 6/2021 | Goodman ............... G06F 16/29 |
| 2022/0060430 A1* | 2/2022 | Milton ................. G06Q 20/227 |
| 2022/0272151 A1* | 8/2022 | Umanesan .......... H04L 67/1012 |
| 2022/0400087 A1* | 12/2022 | Hoover ................. H04L 47/762 |
| 2023/0254265 A1* | 8/2023 | O'Connor ............ H04L 47/822 |
| | | 709/226 |

* cited by examiner

ADAPTING SOFTWARE CODE TO DEVICE RESOURCE AVAILABILITY

TECHNICAL FIELD

Aspects and implementations of the present disclosure relate to data processing, and more specifically, to generating adaptive code based on resource availability.

BACKGROUND

Executable code running on a web browser imparts a burden on a webpage which impacts a website's overall performance and an experience of an end user. For example, the code executing on a website within a web browser can interact with the webpage's Hypertext Markup Language (HTML) document object model (DOM) to perform activities that consume the web browser resources including processing resources (e.g., CPU resources) and network resources (e.g., bandwidth resources). Example activities performed by the code executing via a web browser include the initiation and completion of network requests and the transmission of data and therefore consumes browser resources (e.g. CPU, network).

In some conventional systems, code executing on a website, either by the website itself or by a third party or fourth party service running on the website, is configured to execute the same on all user devices and all network environments. In such systems, the code is designed to run as a one-size-fits all manner, which ignores conditions relating to the user device accessing the webpage.

Other conventional systems deploy code that is pre-configured to run specifically for each individual device type (e.g., code is set up one way for desktop devices, and another way for mobile devices) or web browser type (e.g., code is configured one way for a Google® Chrome web browser and another way for a Microsoft® Internet Explorer web browser). However, segmentation of environments by device type (e.g., desktop, tablet, and mobile) and web browser fails to account for complexities involved with the device and its associated operating environment.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure address the above-identified problems by generating and provisioning computer-executable code that is adapted in view of resource availability associated with a user device. In an embodiment, a system (also referred to as an "adaptive code management system") is configured to identify or detect various resources that are available to the user device on which a web browser is executing code. In an embodiment, the adaptive code management system identifies a web or network environment by measuring available resources provided by or available to the web browser (e.g., processing device availability, network parameters including network type, bandwidth, etc.) at any selected time. According to embodiments, the adaptive code management system generates adaptive code configured to adjust a level of one or more code activities (e.g., capabilities, functions, operations, etc. performed by the code) based on the identified resource availability or operating environment of the user device.

The adaptive code management system performs one or more processes configured to perform measurements (e.g., iterative measurements associated with one or more user devices), learning, and adjustments to monitor and measure the resource availability of the one or more user devices. In an embodiment, the adaptive code is adjusted for execution by a user device in any suitable network environment, on any device type (e.g., desktop, mobile, tablet, etc.). Advantageously, the adaptive code management system can provide on-going monitoring and measuring of the resource availability (e.g., processing resources including available processing power and network availability resources including available bandwidth and transmission rates) associated with the one or more user devices, without the need for prior knowledge of the web environment of the user device or the implementation of static pre-configured settings.

Figure 1:
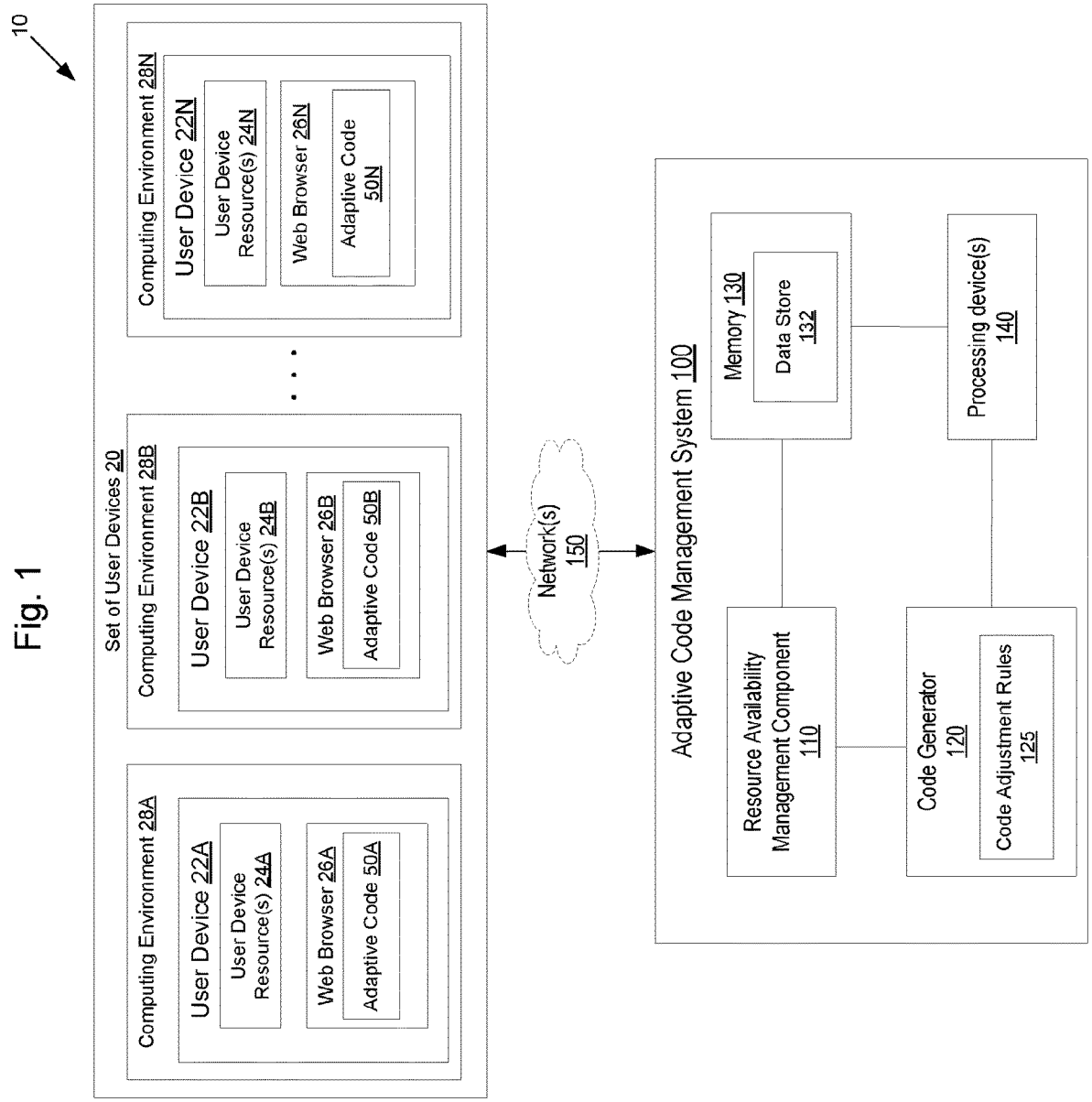
FIG. 1 depicts an illustrative system architecture, in accordance with one or more implementations of the present disclosure.

FIG. 1 depicts an illustrative computing environment 10, in accordance with one or more embodiments of the present disclosure. The system architecture 10 includes an adaptive code management system 100 configured to provide adaptive code (e.g., adaptive code 50A, 50B . . . 50N) to a set of user device 20 including user device 22A, 22B . . . 22N). In an embodiment, the adaptive code management system 100 can be communicatively connected to the set of user devices 20 via on or more networks 150. Example networks 150 can include a public, private, wired, wireless, hybrid network, or a combination of different types of networks. The network 1530 may be implemented as a local area network ("LAN"), a wide area network ("WAN") such as the Internet, a corporate intranet, a metropolitan area network ("MAN"), a storage area network ("SAN"), a Fibre Channel ("FC") network, a wireless cellular network (e.g., a cellular data network), or a combination thereof.

In another embodiment, one or more portions or components of the adaptive code management system 100 including the adaptive code 50A-50N can be installed (e.g., via a plug-in to a web browser of a user device) on and executed by one or more of the user devices 22A-22N. The user devices can include any suitable computing system such as a personal computer (e.g., a desktop computer, laptop computer, server, a tablet computer), a workstation, a handheld device, a web-enabled appliance, a gaming device, a mobile phone (e.g., a Smartphone), an eBook reader, a camera, a watch, an in-vehicle computer/system, or any computing device enable with one or more web browsers (e.g., web browser 26A, 26B . . . 26N).

Various applications or sets of code (e.g., the adaptive code) may run or execute on the user device (e.g., on the operating system (OS) of the user device). In certain implementations, user device 22A-22N can also include and/or incorporate various sensors and/or communications interfaces (not shown). Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, WiFi interface, USB interface, NFC interface, etc. The set of user devices can also include or incorporate one or more third-party or fourth-party services.

In an embodiment, the user devices of the set of user devices 20 operate in a respective computing environment. In the example shown in FIG. 1, user device 22A operates in computing environment 28A, user device 22B operates in computing environment 28B, and user device 22N operates in computing environment 28N. It is noted that the various computer environments 28A-28N can be different from one another, or, in some cases, the computing environment of multiple different user devices can be the same. In an embodiment, the respective computing environments 28A-28N are associated with data relating to the operation, strength, capabilities, functions, etc. of the computing environment (herein also referred to as the "environment data").

In an embodiment, each user device 22A-22N includes a set of one or more user device resources 24A-24N. The user device resources 28A-28N can be defined by a set data relating to the user device (herein also referred to as the "device data"). Example device data can include one or more of a model type associated with the user device, an operating system (e.g., Microsoft® Windows, Apple® IOS, the Android operating system (OS), Google® Chrome OS, etc.), a web browser type (e.g., Microsoft® Internet Explorer, Apple® Safari, Google® Chrome, etc.), processing device types, and any other information relating to the performance, capabilities, functions, and operation of the user device.

In an embodiment, the adaptive code management system 100 is configured to perform various functions, operations, and activities relating to the management of code that is adapted for execution by the respective user devices 22A-22N of the set of user devices 20. In an embodiment, the adaptive code management system 100 can include one or more programs or components configured to perform the functions and operations described in detail herein, including a resource availability management component 110, an adaptive code generator 120, a memory 130 including a data store 132 and one or sets of instructions or programs corresponding to functions, operations, activities, etc. of the adaptive code management system 100. The adaptive code management system 100 also includes one or more processing devices 140 configured to execute the instructions stored in the memory 130 to implement the processes executed by the adaptive code management system 100, as described in greater detail herein.

In an embodiment, the adaptive resource availability management component 110 is configured to provide a user device (e.g., user device 22A) with adaptive code (e.g., adaptive code 50A) for execution via a web browser (e.g., web browser 16A). In an embodiment, the adaptive code is adapted in accordance with the device data, environment data, or a combination thereof.

In an embodiment, the adaptive code supplements other executable code that is native to a web asset (e.g., a web page, web application, etc.) or provided by another party (e.g., third-party web services, fourth-party web services, etc. In an embodiment, the adaptive code collects the device and environment data and adjusts code activities of the adaptive code and other code executing on the web asset (e.g., native code, third-party code, fourth-party code, etc.)

In an embodiment, the adaptive code runs on a user device and collects the device data relating to parameters of the device (e.g., model type, operating system, browser type, etc.) and the environment data (e.g., a network type, a connection strength, a number of tabs open within the web browser, etc.). In an embodiment, the adaptive code evaluates the device data and the environment data and calculates one or more resource availability functions based on the collected resource availability data (e.g., the device data and the environment data). The adaptive code manages a set of the resource availability functions to determine values representing a level of availability of the one or resources of the user device. The one or more resource availability functions can include one or more operations, functions, programs, etc. that are configured to determine a value measuring a level of one or more resources available to a particular user device (i.e., the user device executing the adaptive code and the corresponding resource availability function) at a particular time (e.g., at a time of execution of the resource availability function).

In an embodiment, the resource availability functions can be numeric continuous (e.g., provide value for any computing environment), deterministic (e.g., configured to return the same result any time they are called with a specific set of input values), and can require no prior knowledge or information relating to the user device or computing environment, and may not require any special access to the user device or computing environment be granted to the adaptive code. An example resource availability function includes, but is not limited to, a measurement estimating CPU capabilities of a user device based on a time (e.g., measured in milliseconds) it takes for a function running in a loop with X cycles to execute to completion. In an another example, the resource availability function includes, but is not limited to, a measurement estimating a network strength of a user device based on a time (e.g., measured in milliseconds) it takes for a network to send a request to a remote computing device (e.g., a server/destination) and receive a response.

In an embodiment, the resource availability management component 110 can collect and evaluates the device data, the environment data, and the one or more resource availability function values generated by the adaptive code. In an embodiment, the resource availability management component 110 is configured to employ one or more learning algorithms using the aforementioned data identified by the adaptive code. For example, the resource availability management component 110 can analyze the resource availability function values and generate a segmentation histogram (e.g., based on relative values of a first user device (e.g., user device 22A)) as compared to corresponding resource availability function values of one or more other user devices in the set of user devices 20 (also referred to as the "user device population")). In an embodiment, the segmentation histogram segments the user device population into classifications (e.g., groups, categories, or types) based on their relative resource availability function values (e.g., groups such as "Extremely Strong", "Strong", "Normal", "Weak", "Extremely Weak", or the like).

In an embodiment, the resource availability management component 110 receives the device data and the environment data including the resource availability function values, and, in some instances, information relating to previous parameter adjustments and corresponding measurements relating to impact on the user device (also referred to as "user device impact"). In an embodiment, the resource availability management component 110 stores information relating to the resource availability (device data, environment data), parameters and user device impact in data store 132.

Figure 2:
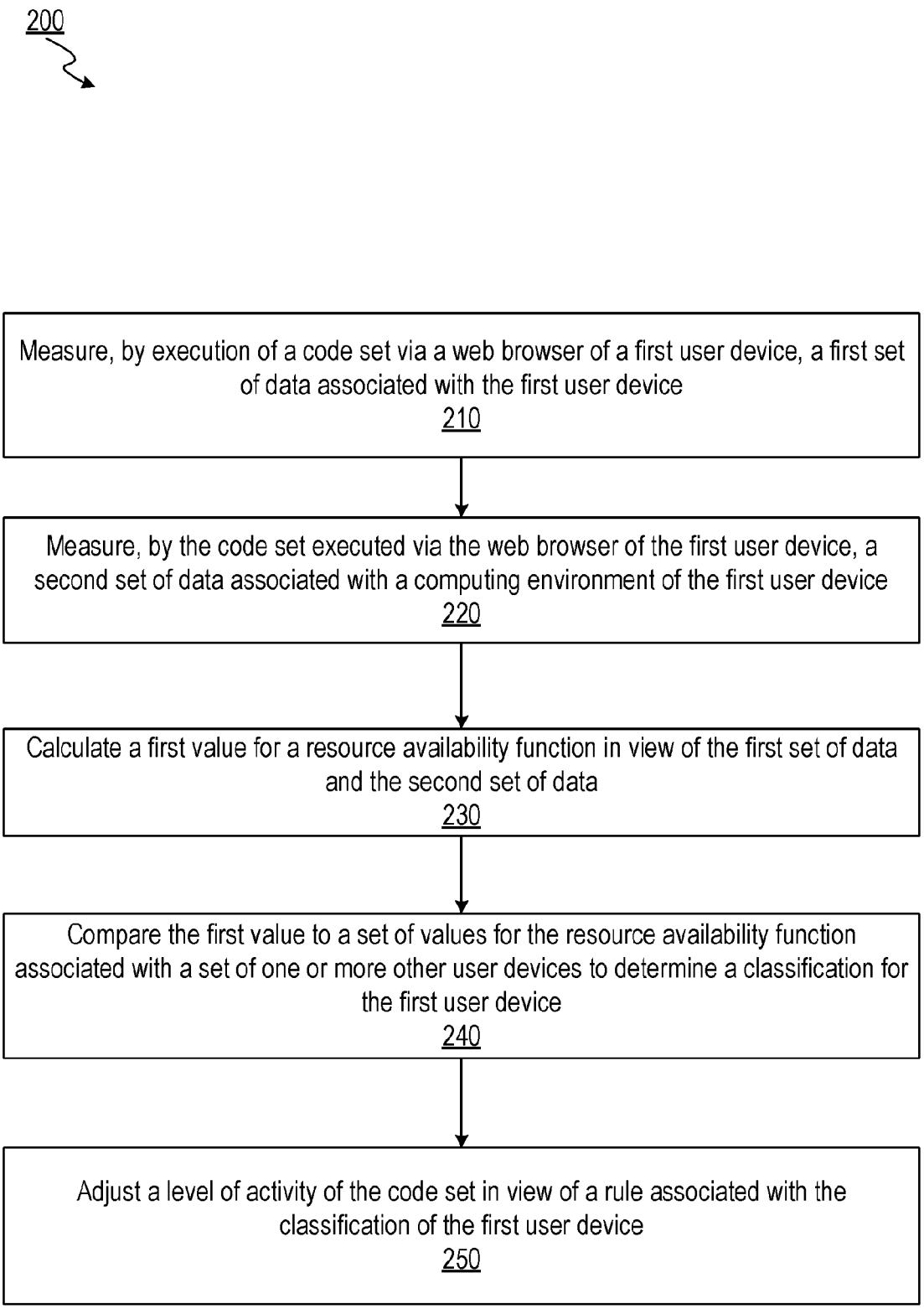
FIG. 2 depicts a process flow including aspects of an example method to adjust a level of activity of a code set executing on a user device, in accordance with one or more implementations of the present disclosure.
Figure 3:
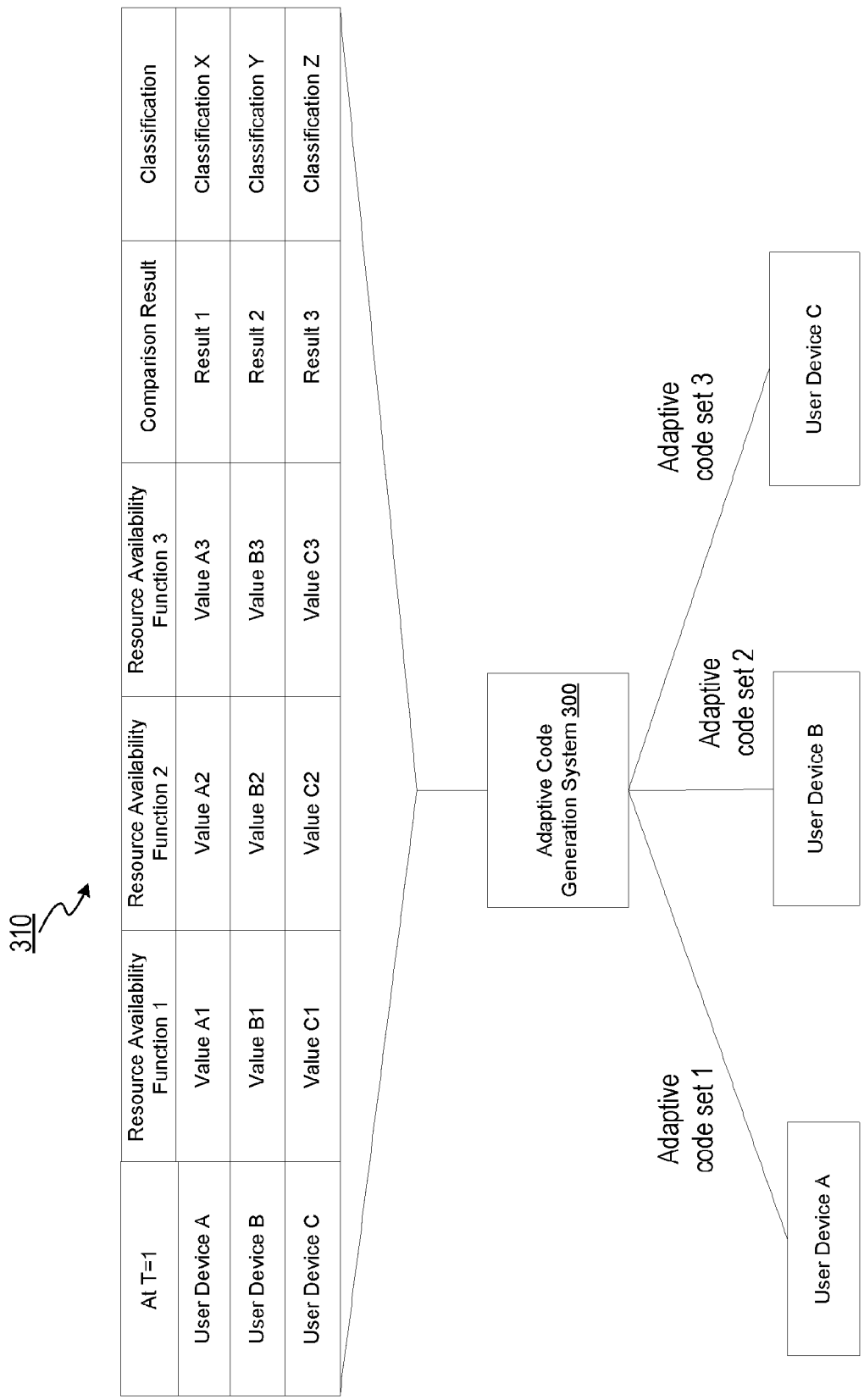
FIG. 3 depicts an example data structure including information relating to resource availability functions and classifications for a set of user devices, in accordance with one or more implementations of the present disclosure.

In an embodiment, the resource availability management component 110 is configured to perform a process (e.g., a resource-based analysis process) including a set of instructions to analyze the one or more resource availability function values received from the set of multiple user devices (e.g., user devices 22A-22N), compare the one or resource availability function values of the multiple user devices and classify the respective user device into a corresponding class, group or segment (e.g., a strong resource classification, a medium resource classification, a weak resource classification, etc.) for each of the resource availability functions, as described in greater detail below with reference to FIGS. 2 and 3.

In an embodiment, the code generator 120 is configured to generate the adaptive code 50A-50N including calculated value ranges using one or more code adjustment rules 125 defining how to adjust the adaptive code's activity based on the provided values. In an embodiment, one or more code adjustment rules 125 can be associated with or mapped to a particular classification, such that the corresponding code adjustment rules are applied to generate the adaptive code for user devices having that particular classification, as described in greater detail with respect to FIGS. 2 and 3. For example, based on a classification of the user device 22A in a "weak" category (as determined by the resource availability management component 110), the code generator 120 can identify one or more code adjustment rules associated with the weak category which indicate that one or more analytics processes that are part of the adaptive code 50A are to be turned off. In another example, the code generator 120 can identify and apply a rule indicating that one or more analysis processes are to be executed at lower frequency (e.g., according to a set schedule or at an established interval). In an embodiment, the code generator 120 and code adjustment rules 125 can be part of the adaptive code 50A-50N.

In an embodiment, the adaptive code 50A-50N adjusts a code activity level based on one or more value ranges embedded in the adaptive code 50A-50N as provided by the code generator 120. In an embodiment, the ranges established by the code generator 120 represent the relativity of the resource availability function values based on the comparison to the overall device population and corresponding classification (e.g., segmentation) performed by the resource availability management component 110. In an embodiment, the adaptive code 50A-50N transmits resource availability functions values to the resource availability management component 110 on an iterative basis to enable on-going analysis and classification (e.g., re-classification) of the user devices in the set of user devices 20 that are executing the adaptive code 50A-50N.

In an embodiment, the adaptive code can be adjusted to a web environment's network and CPU capabilities. For example, the adaptive code can be deployed more aggressively (e.g., in terms of an amount of resources allocated and used in connection with execution of the adaptive code) within an environment classified as strong (e.g., a higher resource utilization), and can run in a lightweight mode (e.g., a lower resource utilization) if the availability and capabilities for a given environment are low.

FIG. 2 depicts a flow diagram of aspects of a method 200 for adjusting a level of activity of a code set in view of a resource availability level of a user device, in accordance with embodiments of the present disclosure. The method is performed by processing logic that may comprise hardware (circuitry, dedicated logic, etc.), software (such as is run on a general purpose computer system or a dedicated machine), or a combination of both. In one implementation, the method is performed by one or more elements depicted and/or described in relation to FIG. 1 (including but not limited to the adaptive code 50A-50N and the adaptive code management system 100), while in some other implementations, one or more blocks of FIG. 2 may be performed by another machine or machines.

For simplicity of explanation, methods are depicted and described as a series of operations. However, the operations in accordance with this disclosure can occur in various orders and/or concurrently, and with other operations not presented and described herein. Furthermore, not all illustrated operations may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In operation 210, the processing logic measures, by a code set executed by a processing device, a first set of data associated with a first user device of set of multiple user devices (e.g., a device population). In an embodiment, the first set of data (e.g., the device data) can include one or more measured values associated with one or more parameters of the first user device, such as, for example a model type, an operating system, a web browser type, etc. For example, the code set is the adaptive code 50A executed by web browser 26A of user device 22A of FIG. 1

In operation 220, the processing logic measures, by the code set, a second set of data associated with a computing environment of the first user device. In an embodiment, the second set of data (e.g., the environment data) includes one or more measured values for one or more parameters associated with a computing environment of the first user device. For example, the second set of data can include data relating to the operation, strength, capabilities, functions, etc. of the computing environment, such as a signal strength, transmission (e.g., upload and/or download speed) rate, bandwidth, processing speed, etc.

In operation 230, the processing logic calculates a first value for a resource availability function in view of the first set of data and the second set of data. In an embodiment, the resource availability function can include a process or set of operations configured to measure or determine a value representing a level of resource availability of the first user device. For example, the resource availability function includes, but is not limited to, a measurement estimating a user device's CPU capabilities based on a time (e.g., measured in milliseconds) it takes for a function executing in a loop with a number of cycles to run to completion. In an another example, the resource availability function can be a measurement of the first user device's network strength based on a time it takes for the first user device to send, via a connected network, a request to a remote system and receive a return transmission (e.g., a response to the request).

In operation 240, the processing logic compares the first value to a set of values for the resource availability function associated with a set of one or more other user devices to determine a classification for the first user device. In an embodiment, the processing logic can classify each of the user devices in a set of user devices into a particular class or category based on a comparison of the respective values of the resource availability function.

For example, as shown in FIG. 3, the processing logic can maintain and employ a data structure 310 including multiple resource availability functions (e.g., resource availability function 1, resource availability function 2, and resource availability function 3). The processing logic can execute each of the resource availability functions at a first time (e.g., T=1) to determine corresponding values for each user device (e.g., user device A, user device B, and user device C) in a set of user devices (collectively the device population).

As shown in FIG. 3, the multiple values (e.g., value A1, value A2, value A3, value B1 . . . value C3) can be compared to one another to generate a comparison result corresponding to each of the user devices (e.g., Result 1, Result 2, Result 3). As illustrated in FIG. 3, based on the relative comparison results of the user devices in the device population, each user device is classified into a classification type (e.g., User Device A is classified in Classification X, User Device B is classified in Classification Y, and User Device C is classified in Classification Z). For example, Classification X can indicate the user device has a "Low Level of Resource Availability, Classification Y can indicate the user device has a "Moderate Level of Resource Availability", and Classification Z can indicate the user device has a "High Level of Resource Availability".

With reference to FIG. 2, in operation 250, the processing logic adjusts a level of activity of the code set in view of a rule associated with the classification of the first user device. In an embodiment, the processing logic can maintain a set of rules governing the manner in which the code set is to be adjusted. For example, a rule can indicate that a limited or maximum number of a particular process (e.g., a number of analytics processes) can be executed by the code set. In an embodiment, a subset of one or more rules can be associated with each of the different classifications. For example, a first subset of rules can be applied to adjust the code set for user devices in a first classification, a second subset of rules can be applied to adjust the code set for user devices in a second classification, and a third subset of rules can be applied to adjust the code set for user devices in a third classification.

In an embodiment, the code set having the adjusted level of activity (e.g. a reduced level of activity for a user device having a low level of resource availability or an increased level of activity for a user device having a high level of resource availability) can be executed by the first user device. Advantageously, the code set can be adapted based on on-going and iterative measurements and determinations based on a resource availability level associated with a user device.

As shown in FIG. 3, the adaptive code generation system 300 can apply the one or more rules associated with the respective classifications to generate an adaptive code set for execution by the respective user devices. In the illustrated example, the adaptive code generation system 300 generates adaptive code set 1 generated based on the one or more rules associated with Classification X, adaptive code set 2 based on the one or more rules associated with Classification Y, and adaptive code set 3 based on the on the or more rules associated with Classification Z. For example, Classification X can indicate a "strong" categorization wherein user devices in this category have a relative strongest or highest level of resource availability as compared to the other user devices in the device population. In this example, Classification Z can indicate a "weak" categorization wherein user devices in this category have a relative weakest or lowest level of resource availability as compared to the other user devices in the device population. In this example, Classification Y can indicate a "moderate" categorization wherein user devices in this category have a relatively moderate or average level of resource availability as compared to the other user devices in the device population In an embodiment, as illustrated in FIGS. 2 and 3, the adaptive code can be adjusted to a user device's web environment, network capabilities, and processing capabilities. For example, the adaptive code can be deployed more aggressively (e.g., in terms of an amount of resources allocated and used in connection with execution of the adaptive code) within an environment classified as "strong" (e.g., wherein the adaptive code is configured to execute at a higher resource utilization rate). In another example, the adaptive code can be adapted to execute in a lightweight mode (e.g., wherein the adaptive code is configured to execute at a lower resource utilization rate) if the availability and capabilities for a given environment are low and the user device is classified in a "weak" category.

In an embodiment, the various operations of method 200 can be performed iteratively with respect to multiple different user devices of the device population. In this regard, at multiple different times (e.g., T=2, T=3, T=4, etc. in the example shown in FIG. 3), the device and environment data can be measured by the adaptive code. The collected data can be used to determine updated values for the one or more resource availability functions and a new or updated comparison result can be determined for each of the user devices in the device population. Accordingly, at various different times, the adaptive code generation system 300 can generative a new or updated adaptive code set for each of the user devices. Advantageously, the updated adaptive code sets generated at different points in time can take into account any changes in the device data or environment data that has an impact on a resource availability level of the user device.

In an embodiment, in addition to adjusting the code activity level, the adaptive code continues to identify and collect resource availability function values for the execution of one or more learning processes (e.g., machine learning, modeling, etc.). In an embodiment, information associated with the adaptive code, device data and environment data associated with the device population can be stored in a data store and processed via one or more learning models to generate improvements, changes, updates, or adjustments to the one or more resource availability functions, segments or classifications, or other parameters of the adaptive code management system.

Figure 4:
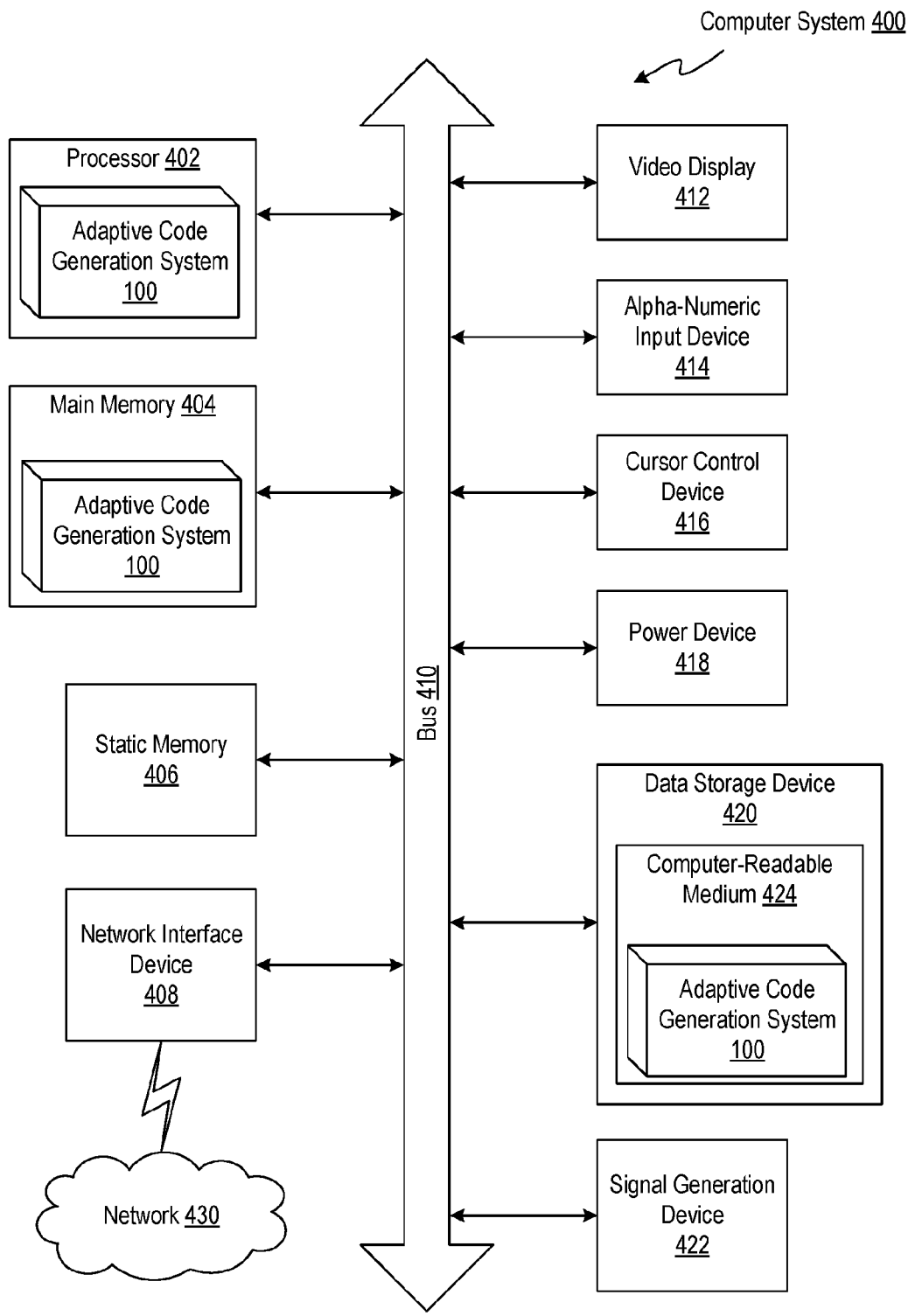
FIG. 4 depicts a block diagram of an illustrative computer system operating in accordance with aspects and implementations of the present disclosure.

FIG. 4 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a computing device integrated within and/or in communication with a vehicle, a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions of an adaptive code generation system 100 for performing the operations discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., instructions executed by the adaptive code generation system 100) embodying any one or more of the methodologies or functions described herein. The instructions of the adaptive code generation system 100 may also reside, completely or at least partially, within the main memory 404 and/or within the processor 402 during execution thereof by the computer system 400, the main memory 404 and the processor 402 also constituting computer-readable media. The instructions of the adaptive code generation system 100 may further be transmitted or received over a network via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "measuring," "processing," "comparing," "adjusting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform certain operations. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to practically any type of data. The scope of the disclosure should, therefore, be determined with reference to the appended claims, along with the full scope of equivalents to which such claims are entitled.

What is claimed is:

1. A method comprising:
   measuring, by a code set executed by a processing device, a first set of data associated with a first user device of a plurality of user devices;

measuring, by the code set, a second set of data associated with a computing environment of the first user device;
calculating a first value for a resource availability function in view of the first set of data and the second set of data;
comparing the first value to a set of values for the resource availability function associated with the plurality of user devices to determine a classification for the first user device;
identifying a set of rules associated with the classification; and
adjusting, based on a least a portion of the set of rules, the code set to generate an adapted code set, wherein a first level of execution of one or more processes by the code set is different than a second level of execution of the one or more processes by the adapted code set.

2. The method of claim 1, wherein the resource availability function comprises a measurement estimating a processing level of the first user device based on a time to complete execution of a set of cycles.

3. The method of claim 1, wherein the resource availability function comprises a measurement of a network strength of the first user device based on a duration of time to send a request from the first user device to a remote system and receive a return transmission from the remote system.

4. The method of claim 1, wherein the at least the portion of the set of rules causes adjusting one or values of the code set to generate the adapted code set.

5. The method of claim 1, further comprising:
measuring, by execution of the adapted code set, an updated first set of data associated with the first user device;
measuring, by execution of the adapted code set, an updated second set of data associated with the computing environment of the first user device; and
calculating a second value for the resource availability function in view of the updated first set of data and the updated second set of data.

6. The method of claim 5, further comprising:
comparing the second value to a second set of values for the resource availability function associated with the plurality of user devices to determine a new classification for the first user device.

7. The method of claim 6, further comprising generating a further adjusted code set based on at least a portion of a second set of rules associated with the new classification.

8. A system comprising:
a memory to store instructions; and
a processing device, operatively coupled to the memory, the processing device to execute the instructions to perform operations comprising:
measuring, by a code set executed via a web browser of a first user device, a first set of data associated with the first user device of a plurality of user devices;
measuring, by the code set, a second set of data associated with a computing environment of the first user device;
calculating a first value for a resource availability function in view of the first set of data and the second set of data;
comparing the first value to a set of values for the resource availability function associated with the plurality of user devices to determine a classification for the first user device;
identifying a set of rules associated with the classification; and
adjusting, based on a least a portion of the set of rules, the code set to generate an adapted code set, wherein a first level of execution of one or more processes by the code set is different than a second level of execution of the one or more processes by the adapted code set.

9. The system of claim 8, wherein the resource availability function comprises a measurement estimating a processing level of the first user device based on a time to complete execution of a set of cycles.

10. The system of claim 8, wherein the resource availability function comprises a measurement of a network strength of the first user device based on a duration of time to send a request from the first user device to a remote system and receive a return transmission from the remote system.

11. The system of claim 8, the operations wherein the at least the portion of the set of rules causes adjusting one or values of the code set to generate the adapted code set.

12. The system of claim 8, the operations further comprising:
measuring, by execution of the adapted code set, an updated first set of data associated with the first user device;
measuring, by execution of the adapted code set, an updated second set of data associated with the computing environment of the first user device; and
calculating a second value for the resource availability function in view of the updated first set of data and the updated second set of data.

13. The system of claim 12, the operations further comprising:
comparing the second value to a second set of values for the resource availability function associated with the plurality of user devices to determine a new classification for the first user device; and generating an adjusted code set in view of a second rule associated with the new classification.

14. The system of claim 8, the operations further comprising:
providing the code set to the user device for installing and executing via the web browser.

15. A non-transitory computer readable medium having instructions stored thereon that, if executed by a processing device, cause the processing device to perform operations comprising:
measuring, by a code set executed via a web browser of a first user device, a first set of data associated with the first user device of a plurality of user devices;
measuring, by the code set, a second set of data associated with a computing environment of the first user device;
calculating a first value for a resource availability function in view of the first set of data and the second set of data;
comparing the first value to a set of values for the resource availability function associated with the plurality of user devices to determine a classification for the first user device;
identifying a set of rules associated with the classification; and
adjusting, based on a least a portion of the set of rules, the code set to generate an adapted code set, wherein a first level of execution of one or more processes by the code set is different than a second level of execution of the one or more processes by the adapted code set.

16. The non-transitory computer readable medium of claim 15, wherein the resource availability function comprises a measurement estimating a processing level of the first user device based on a time to complete execution of a set of cycles.

17. The non-transitory computer readable medium of claim 15, wherein the resource availability function comprises a measurement of a network strength of the first user device based on a duration of time to send a request from the first user device to a remote system and receive a return transmission from the remote system.

18. The non-transitory computer readable medium of claim 15, wherein the at least the portion of the set of rules causes adjusting one or values of the code set to generate the adapted code set.

19. The non-transitory computer readable medium of claim 15, the operations further comprising:
   measuring, by execution of the adapted code set, an updated first set of data associated with the first user device;
   measuring, by execution of the adapted code set, an updated second set of data associated with the computing environment of the first user device; and
   calculating a second value for the resource availability function in view of the updated first set of data and the updated second set of data.

20. The non-transitory computer readable medium of claim 19, the operations further comprising:
   comparing the second value to a second set of values for the resource availability function associated with the plurality of user devices to determine a new classification for the first user device; and generating an adjusted code set in view of a second rule associated with the new classification.

\* \* \* \* \*